US008677802B2

(12) United States Patent
Hower et al.

(10) Patent No.: US 8,677,802 B2
(45) Date of Patent: Mar. 25, 2014

(54) SENSING MODULES AND METHODS OF USING

(75) Inventors: Robert William Hower, Brighton, MI (US); Yafan Zhang, Troy, MI (US); Navid Yazdi, Ann Arbor, MI (US)

(73) Assignee: Evigia Systems, Inc., Ann Arbor, MI (US)

( * ) Notice: Subject to any disclaimer, the term of this patent is extended or adjusted under 35 U.S.C. 154(b) by 469 days.

(21) Appl. No.: 12/862,162

(22) Filed: Aug. 24, 2010

(65) Prior Publication Data

US 2011/0203347 A1 Aug. 25, 2011

Related U.S. Application Data

(63) Continuation-in-part of application No. 11/671,130, filed on Feb. 5, 2007, now Pat. No. 7,907,037.

(60) Provisional application No. 61/274,898, filed on Aug. 24, 2009, provisional application No. 60/765,244, filed on Feb. 4, 2006.

(51) Int. Cl.
*G01M 7/00* (2006.01)
*G01N 3/30* (2006.01)
*G01N 3/32* (2006.01)
*G01P 15/00* (2006.01)

(52) U.S. Cl.
USPC ............... 73/12.01; 73/862.381; 73/862.51; 73/862.53

(58) Field of Classification Search
USPC ................... 73/12.01, 492, 862.53
See application file for complete search history.

(56) References Cited

U.S. PATENT DOCUMENTS

| 3,593,249 | A | | 7/1971 | Sedgwick |
| 3,706,952 | A | | 12/1972 | Alley |
| 4,016,766 | A | | 4/1977 | Morris |
| 4,255,629 | A | | 3/1981 | Bell |
| 4,284,862 | A | | 8/1981 | Overman et al. |
| 4,695,963 | A | * | 9/1987 | Sagisawa et al. ............. 700/258 |
| 4,855,544 | A | | 8/1989 | Glenn |
| 4,959,515 | A | | 9/1990 | Zavracky et al. |
| 4,970,724 | A | | 11/1990 | Yung |

(Continued)

OTHER PUBLICATIONS

Authors: Andrew Mason, Navid Yazdi, Abhijeet V. Chavan, Khalil Najafi, and Kensall D. Wise, Title: "A Generic Multielement Microsystem for Portable Wireless Applications", Proceedings of the IEEE, Vol. 86, No. 8, Aug. 1998, pp. 1733-1746.*

(Continued)

*Primary Examiner* — Lisa Caputo
*Assistant Examiner* — Roger Hernandez-Prewitt
(74) *Attorney, Agent, or Firm* — Hartman Global IP Law; Gary M. Hartman; Domenica N. S. Hartman

(57) ABSTRACT

A sensing module and method for monitoring various physical parameters, and particularly environmental parameters to which a living body may be subjected, for example, impacts and shock wave pulses. The module at least one energy storage device and at least one set of electromechanical sensing elements contained in a housing. The sensing elements are responsive to an external environmental input, and each sensing element defines an open electrical path when not subjected to the input, is operable to define a closed electrical path that produces an output in response to the input if the input exceeds a threshold of the sensing element. The module generates data corresponding to the outputs of the sensing elements and records the data.

43 Claims, 9 Drawing Sheets

(56) References Cited

U.S. PATENT DOCUMENTS

| | | | |
|---|---|---|---|
| 5,164,558 A * | 11/1992 | Huff et al. | 200/83 R |
| 5,712,609 A | 1/1998 | Mehregany et al. | |
| 5,966,066 A | 10/1999 | Mehregany et al. | |
| 5,978,972 A * | 11/1999 | Stewart et al. | 2/422 |
| 6,080,944 A * | 6/2000 | Itoigawa et al. | 200/61.45 R |
| 6,126,311 A | 10/2000 | Schuh | |
| 6,236,005 B1 * | 5/2001 | Kvisteroey et al. | 200/61.45 R |
| 6,617,963 B1 | 9/2003 | Watters et al. | |
| 6,731,550 B2 | 5/2004 | McClure | |
| 6,800,912 B2 | 10/2004 | Ozgur | |
| 6,861,917 B2 | 3/2005 | Stevenson et al. | |
| 6,919,803 B2 | 7/2005 | Breed | |
| 6,975,193 B2 | 12/2005 | Knieser et al. | |
| 7,022,540 B2 | 4/2006 | Kim et al. | |
| 7,034,677 B2 | 4/2006 | Steinthal et al. | |
| 2004/0214543 A1 | 10/2004 | Osone et al. | |

OTHER PUBLICATIONS

Author: Sherry Selevan, Ph.D., Title: "Final Report, Use of 1) Sensors and 2) Radio Frequency 10 (RFIO) for the National Children's Study", Date: Aug. 25, 2004, Publisher: U.S. Environmental Protection Agency (EPA), EPA 600/R-05/018, total pp. 85.*

Authors: Arjun Selvakumar, Navid Yazdi and Khalil Najafi, Title: "A wide-range micromachined threshold accelerometer array and interface circuit", Date: 2001, Publisher: Institute of PhysicsS Publishing (IOP Publishing Ltd), Journal of Micromech. Microeng. 11 (2001) 118-125, pp. 118-125.*

Authors: Navid Yazdi, Farrokh Ayazi, and Khalil Najafi, Title: "Micromachined Inertial Sensors", Proceedings of the IEEE, Vol. 86, No. 8, Aug. 1998, pp. 1640-1659.*

Author: Khalil Najafi, Title: "Micropackaging Technologies for Integrated Microsystems: Applications to MEMS and MOEMS", Micromachining and Microfabrication Process Technology VIII, Proceedings of SPIE, vol. 4979 (2003) © 2003 SPIE, pp. 1-19.*

* cited by examiner

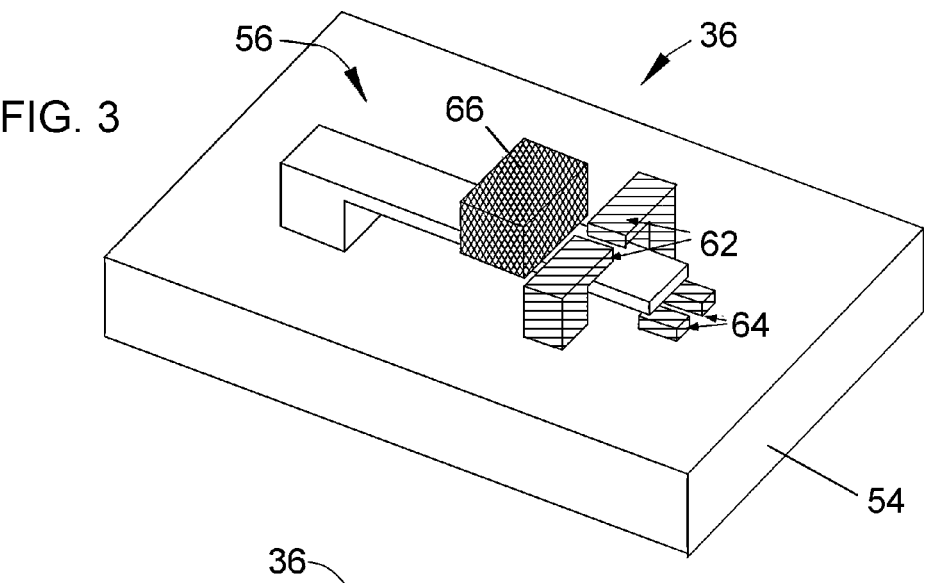
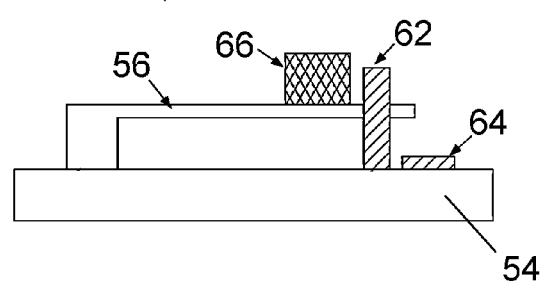
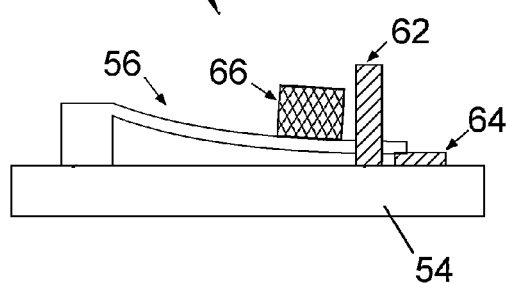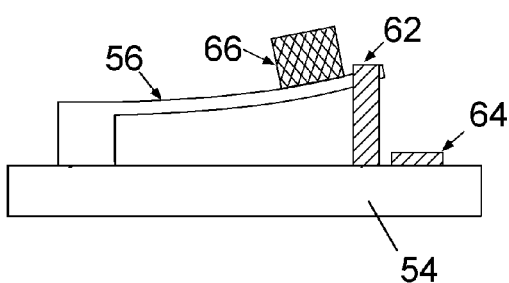

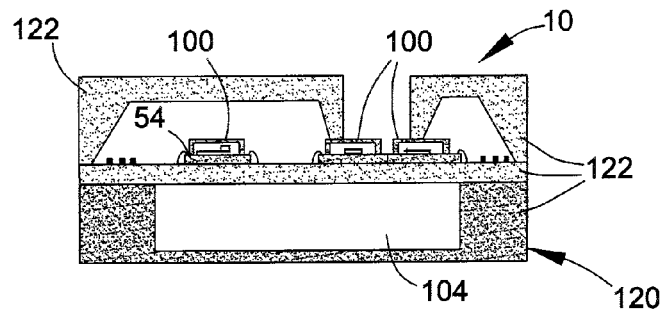
FIG.21
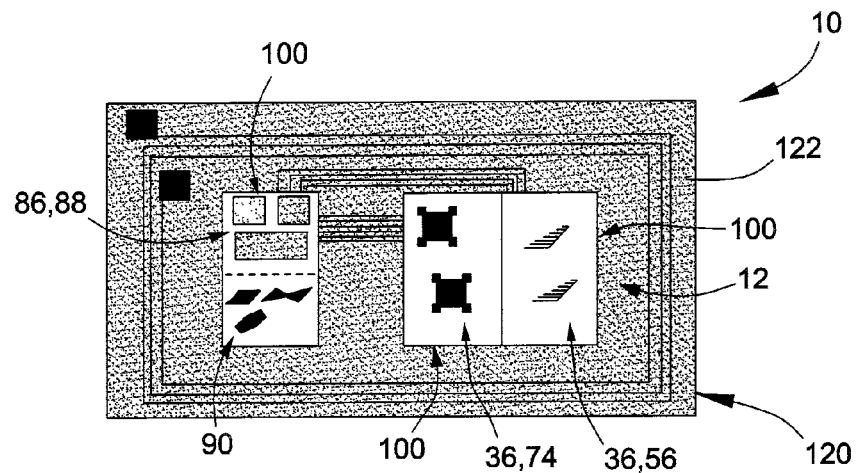
FIG.22
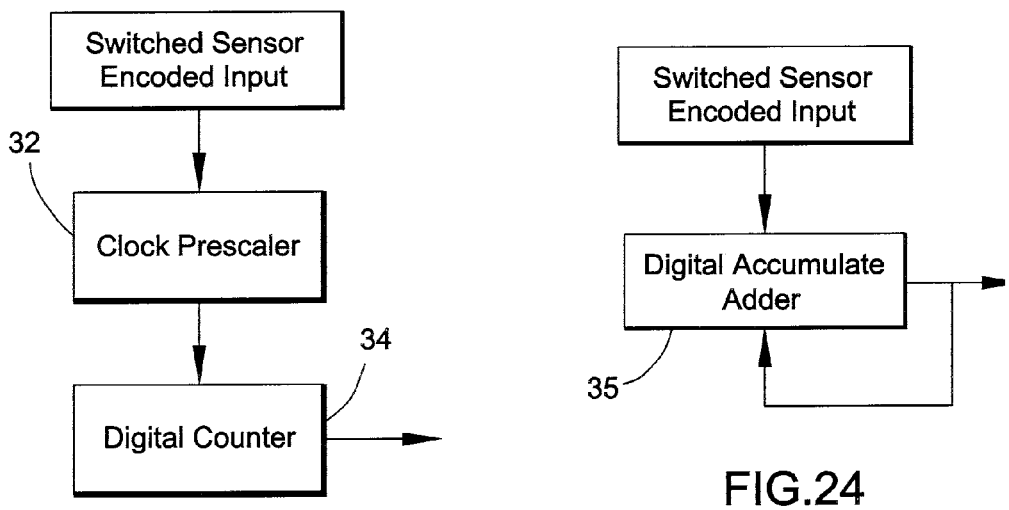
FIG.23
FIG.24

SENSING MODULES AND METHODS OF USING

CROSS REFERENCE TO RELATED APPLICATIONS

This application claims the benefit of U.S. Provisional Application No. 61/274,898, filed Aug. 24, 2009, and is a continuation-in-part patent application of co-pending U.S. patent application Ser. No. 11/671,130, filed Feb. 5, 2007, which claimed the benefit of U.S. Provisional Application No. 60/765,244, filed Feb. 4, 2006. The contents of these prior applications are incorporated herein by reference.

BACKGROUND OF THE INVENTION

The present invention generally relates to sensing technology that employs electromechanical sensing devices, such as micro-electromechanical systems (MEMS) and nano-electromechanical systems (NEMS). More particularly, this invention relates to sensing systems and methods capable of monitoring environmental parameters to which a body may be subjected, particular but nonlimiting examples of which are pressure and acceleration resulting from blasts and impacts sustained by a body, including a living body.

Wireless sensor systems are known that have the capability for high reliability, efficiency, and performance. Such systems can be employed in a wide range of applications including supply-chain and logistics, industrial and structural monitoring, healthcare, homeland security, and defense. Generally, it is desired to minimize the power dissipation, size, and cost of these systems by making them low-power and/or operate without a battery. Furthermore, in many applications a batteryless operation is needed due to lack of battery replacement feasibility, or to meet stringent cost, form factor, and lifetime requirements. One approach to addressing this need is scavenging energy from environmental sources such as ambient heat, radio and magnetic waves, vibrations, and light. However, in many situations, these environmental energy sources are not adequately available to power a sensor. Another approach is to remotely power wireless sensor systems by inductive or electromagnetic coupling, storing energy on a suitable energy storage device, such as one or more integrated capacitors or miniature batteries, and performing sensor operations over short periods of time to minimize the discharge rate of the energy storage device. These approaches typically benefit from miniaturization of the sensing element or elements. For example, micro-electromechanical system (MEMS) and nano-electromechanical system (NEMS) sensors have been developed that can be placed in or on an object or a living body for continuous monitoring. Various types of electromechanical sensors have been developed for sensing a wide variety of parameters, including but are not limited to temperature, pressure, acceleration (including impact or shock), vibration, impact, motion, and chemical content.

There are many health issues that would benefit from a real-time monitoring capability, including the severity of an environmental condition encountered by an individual. For example, medical treatment of athletes and military personnel subjected to sudden decelerations (such as impacts or shocks) and military personnel subjected to bomb blasts would be facilitated if medical personnel had a more immediate and clearer understanding of the severity of the impact or blast to which the person was subjected, and therefore the likelihood that the individual has suffered from head trauma and the likely severity of that trauma.

For treatment of blast victims, current injury models look at one type of exposure data to estimate the severity of a blast to which the victim was exposed. However, these models require more epidemiological studies on actual blast victims to determine optimal parameters for monitoring. Because the brain is a very complex system, there is no current consensus of optimal monitoring parameters for determining the many different types of brain injury. One parameter that is currently monitored is head acceleration, which can aid in the diagnosis of brain injuries. Current monitoring systems place accelerometers on the helmets of soldiers to record blast data. However, the data from these sensors are not quickly and readily available to a field medic or other medical personnel, and do not correlate well with the actual acceleration of the head. Furthermore, a technical complication of these systems is that the transfer function from motion of the helmet to motion of the head is different for every individual, and can depend on the fit of the helmet, tightness of the chin strap, how the helmet is worn, and many other factors that vary from individual to individual.

Another approach to diagnosing and treating blast victims is to assess brain injury due to the shock wave pulse. Though research involving animal studies have been conducted, a difficulty encountered when monitoring blast pressure waves is that most pressure sensors are directional, and it is therefore difficult to measure the shock wave pulse from a blast of unknown direction. In addition, it is difficult to reconstruct data and then apply the data to a traumatic injury after the fact due to human reactions to the event that can affect the data (reflexes). Consequently, the use of the shock wave pulse to diagnose and treat blast victims has been primarily limited to laboratory tests.

To be practical and widely accepted for applications of the type discussed above, suitable sensing devices would preferably be small and unobtrusive, have a long life, and be disposable, necessitating that their cost must be very low, yet also capable of accurately monitoring many types of trauma on a wide range of individuals performing a wide variety of activities. However, existing impact sensing systems are typically large, heavy and very expensive, consume a significant amount of power, and require batteries that must be changed on a fairly regular basis. Aside from players of high impact sports, it is nearly impossible to predict the occurrence of head impact and the subsequent trauma. Consequently, currently available systems are not widely used, and then typically limited to occasional uses, such as monitoring deceleration or impact on equipment worn by athletes, such as helmets of the types worn in hockey or American football. Still, and for reasons stated previously, such uses often provide data that do not correlate well with the actual deceleration of the head.

BRIEF SUMMARY OF THE INVENTION

The present invention provides sensing modules and methods for monitoring various physical parameters, and particularly environmental parameters to which a living body may be subjected, for example, impacts and shock wave pulses.

According to a first aspect of the invention, a sensing module is provided for monitoring at least one external environmental input. The sensing module includes a housing that contains at least one energy storage device and at least one set of electromechanical sensing elements. The electromechanical sensing elements are responsive to an external environmental input, and each electromechanical sensing element defines an open electrical path when not subjected to the external environmental input, is operable to define a closed electrical path that produces an output in response to the external environmental input only while the electromechanical sensing element is subject to the external environmental input and if the external environmental input exceeds a threshold of the electromechanical sensing element, and then again defines the open electrical path thereof so as not to produce an output when no longer subject to the external environmental input that exceeded the threshold thereof. The sensing module further includes means within the housing for generating data corresponding to the outputs of the electromechanical sensing elements, and means within the housing for recording the data. According to a preferred aspect of this embodiment, the electromechanical sensing elements, the generating means, and the recording means are powered only by the energy storage device when, respectively, producing the output, generating the data, and recording the data in response to the external environmental input that exceeded the threshold of one or more of the electromechanical sensing elements.

According to a second aspect of the invention, a method is provided for monitoring at least one external environmental input to which a body is subjected. The method entails the use of a sensing module that comprises a rigid housing containing at least one energy storage device, at least one set of electromechanical sensing elements that are responsive to at least one external environmental input, means for generating outputs corresponding to the external environmental input to which the electromechanical sensing elements are subjected, and means for recording data corresponding to the outputs. Each electromechanical sensing element produces an output in response to the external environmental input only while the electromechanical sensing element is subject to the external environmental input and if the external environmental input exceeds a threshold of the electromechanical sensing element. The method further entails attaching the housing to a body, monitoring the external environmental input to which the body is subjected by monitoring multiple levels of the external environmental input to which the electromechanical sensing elements are subjected while attached to the body, producing outputs corresponding to the levels of the external environmental input sensed by the electromechanical sensing elements, storing data in the recording means within the housing corresponding to the output of the electromechanical sensing elements, and then wirelessly retrieving the data stored in the recording means while the housing remains attached to the body.

A third first aspect of the invention relates to a sensing module for monitoring at least one external environmental input. The sensing module includes a housing and at least one set of electromechanical sensing elements within the housing. The electromechanical sensing elements are responsive to an external environmental input received from at least five directions that are orthogonal to each other. According to a preferred aspect of this embodiment, the multi-directional capability enables the sensing module to be used in situations in which the directional origin of the external environmental input is unknown or unpredictable, as is the case with impacts that occur to military personnel and to individuals participating in athletic and recreational activities, and blasts to which military personnel are subjected.

According to preferred aspects of the invention, the sensing modules and methods are capable of very accurately monitoring impacts, shock wave pulses and other environmental parameters to which a living body may be subjected, thereby improving diagnosis and treatment methodologies. Another preferred but optional aspect is that the module is able to operate with minimal power so that power is available for module operation over longer periods of time. In particularly preferred embodiments, the electromechanical sensing elements scavenge power from the body, providing a continuous or intermittent monitoring capability over extended periods of time. The module is preferably configured to be sufficiently small and light to be attached to a body without being obtrusive, enabling the module to be used by a wide range of individuals while performing a wide variety of activities.

Other objects and advantages of this invention will be better appreciated from the following detailed description.

BRIEF DESCRIPTION OF THE DRAWINGS

FIGS. 3 and 4 schematically represent perspective and side views, respectively, of an electromechanical sensing element configured as an impact sensing element that is suitable for use in the modules of FIGS. 1 and 2.

FIGS. 5 and 6 schematically represent the sensing element of FIGS. 3 and 4 at opposite extremes of its operating range in response to two threshold impact and/or acceleration conditions.

FIGS. 21 and 22 schematically represent side and plan views, respectively, of a housing containing multiple chip packages that contain arrays of electromechanical sensing elements suitable for use in modules of the types represented in FIGS. 1 and 2.

FIGS. 23 and 24 depict two approaches for reducing power consumption of modules of the types represented in FIGS. 1 and 2 when calculating a Head Injury Criterion (HIC) value.

DETAILED DESCRIPTION OF THE INVENTION

The present invention provides miniature sensing modules whose small size enables the modules to be placed on a body, including but not limited to humans or equipment or apparel worn by humans, where the modules can be used to monitor and generate data relating to one or more external inputs, such as external environmental parameters to which the body may be subjected. The modules make use of an energy storage device and at least one set of electromechanical sensing elements. The modules also preferably make use of non-volatile memory to store the data and a wireless communication system that enables the data to be retrieved from the modules by a wireless external interrogator/reader (reader) unit. The components of the modules are preferably selected so that the modules require very little power for their operation, enabling the modules to remain operable for long periods of time, potentially on the order of years, without need for replacement.

As will be evident from the following description, a particular object of this invention is to extend the life of a sensing module that employs an energy storage device, for example, a capacitor, battery or other suitable energy storage device. As will be discussed in more detail below, one such approach is to configure the electromechanical sensing elements to operate in response to the external input without drawing power from the energy storage device. Preferred electromechanical sensing elements are micro-electromechanical system (MEMS) and nano-electromechanical system (NEMS) sensing elements. As used herein, the terms MEMS and NEMS denote miniature devices generally on a scale of less than a millimeter and less than a micrometer, respectively, that incorporate both electronic and mechanical functionalities, and are produced by micromachining techniques, such as bulk etching and surface thin-film etching.

Figure 1:
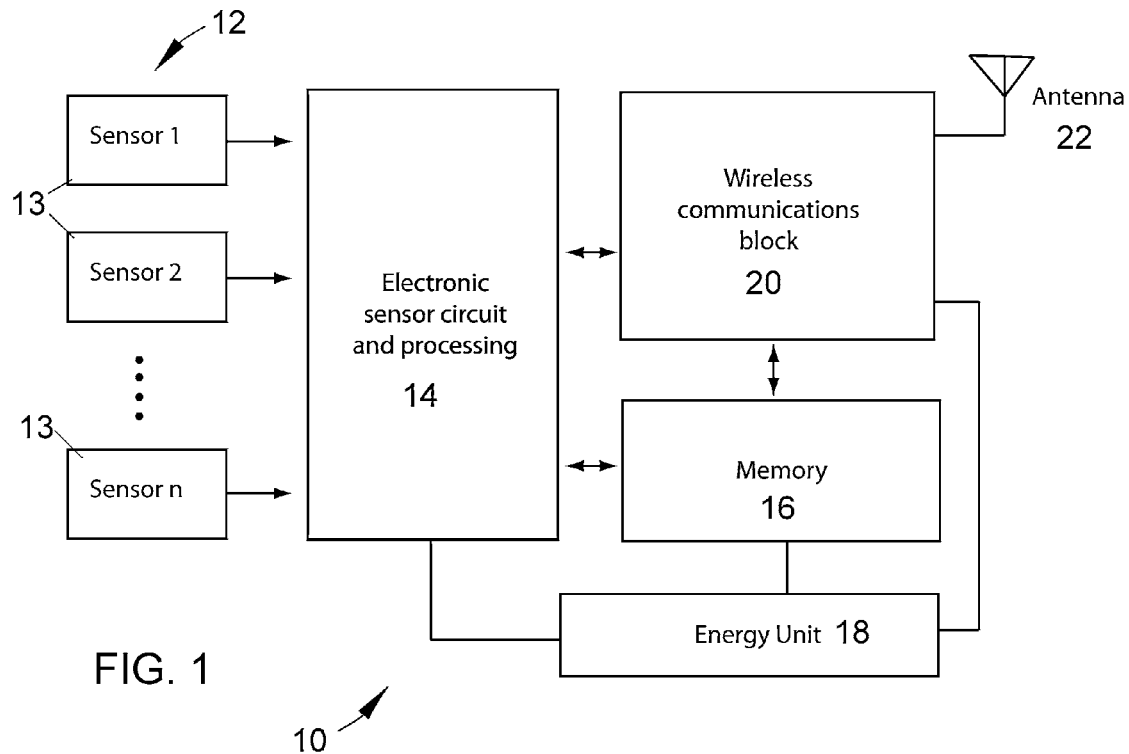
FIGS. 1 and 2 represent block diagrams of sensing modules in accordance with embodiments of the invention.

FIG. 1 represents a block diagram of a sensing module 10 according to one embodiment of the invention. The system architecture of the module 10 includes an array 12 of digital sensing elements 13 connected to a controller 14 that electronically monitors and processes the outputs generated by the elements 13, and then stores data corresponding to the outputs into memory 16. The elements 13 can been configured to be responsive to a variety of external environmental parameters, such as acceleration (and deceleration), pressure (including shock waves from blasts) and temperature as indicated in FIG. 1, as well as a variety of other parameters. For this reason, the elements 13 can employ various types of mechanical structures that move in response to the parameter of interest. The sensing elements 13 can be fabricated on a single circuit chip or multiple circuit chips and mounted within a rigid housing (not shown) in which the components of the module 10 are packaged. Individual chips on which the sensing elements 13 are fabricated can be micropackaged during their batch-manufacturing prior to mounting within the module housing. The controller 14 can also be conventionally fabricated on an integrated circuit chip. The memory 16 preferably comprises nonvolatile digital memory devices, such as one or more CMOS chips, though other types of memory devices can also be used. Data processing performed by the controller 14 may include eliminating any false outputs and filtering the data before storage to reduce the memory required to store the data in the memory 16. The controller 14 preferably utilizes integrated ultra-low power digital signal processing to compress and store the data.

The module 10 also comprises an energy management unit 18 that contains an energy storage device (not shown) for supplying DC power to the controller 14, as well as to a wireless communications block 20 adapted to transmit the data through an antenna 22 to an external reader unit (not shown). The energy storage device may be a capacitor, battery or any other suitable type of power storage device. Along with the one or more sensing element chips, the antenna 22 and the chips on which the controller 14, memory 16 and energy management unit 18 are fabricated can all be packaged within the same housing.

Wireless communication between the module 10 and a reader unit may be through a passive RFID communications protocol, though other wireless protocols are also foreseeable. As an example, 13.56 MHz RFID operating under the ISO15693/ISO18000-3 protocol supports simultaneous data collection by a single reader unit from up to fifteen modules 10 having unique electronic ID codes. When a communications (e.g., interrogation) signal generated by a reader unit is received by the wireless communications block 20, the data stored in the memory 16 is accessed. The wireless communications block 20 can also be used to scavenge energy from the communications signal received from the reader unit and store the energy into the energy storage device (e.g., capacitor, battery, etc.) within the energy storage unit 18. The module 10 may also be electronically configurable through its wireless link to initialize the sensing elements 13 and their sensing ranges, designate the parameters that are to be recorded in the memory 16, and reset the sensing elements 13 and memory 16 as may be desired, for example, after data have been uploaded to the reader unit.

Figure 2:
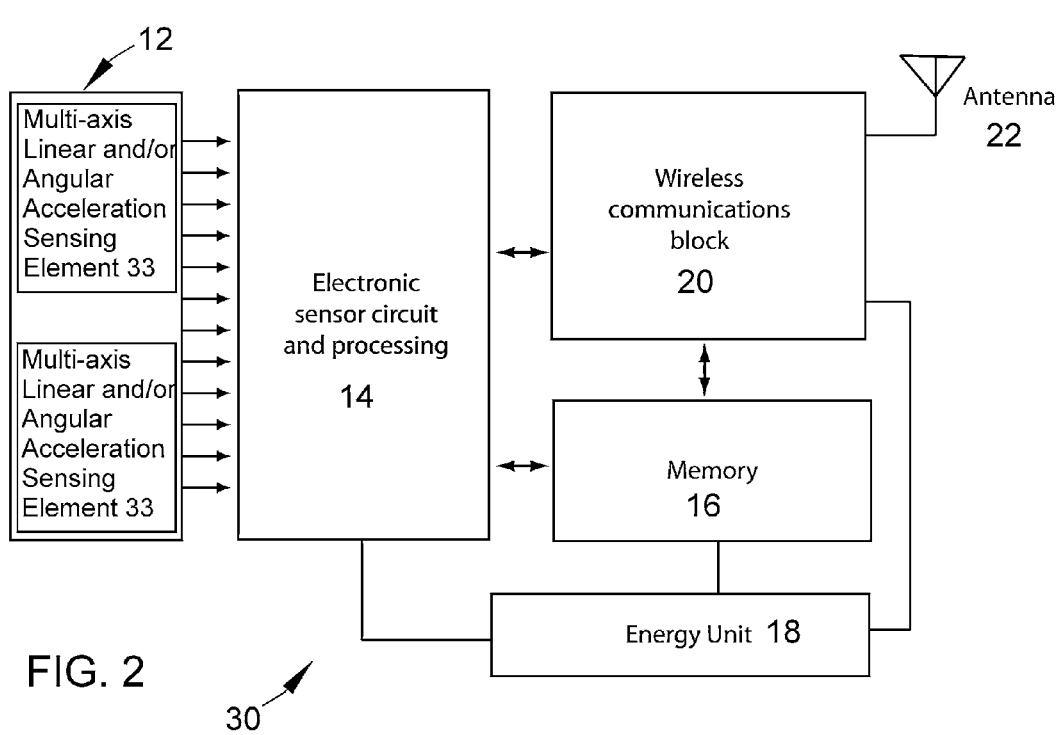

FIG. 2 represents a block diagram of a sensing module 30 according to another embodiment of the invention. For convenience, identical reference numerals are used in FIG. 2 to denote the same or functionally equivalent elements described for the module 10 of FIG. 1. The module 30 of FIG. 2 differs from the embodiment of FIG. 1 by identifying the entire array 12 of sensing elements as digital acceleration sensing elements 33 with different sensing modes, which in combination can provide a six-degree of freedom (DOF) sensing capability. As will be discussed in reference to FIG. 13, in one embodiment of the invention the module 30 has an integrated six-axis acceleration capability provided with sensing elements 33 comprised of a combination of linear and angular acceleration sensors. As with the sensing elements 13 of FIG. 1, the sensing elements 33 can be fabricated on a single circuit chip or multiple circuit chips.

The overall combination of small-size, light-weight, wireless data and command link, and electronic configurability enable the modules 10 and 30 to be attached to or embedded in various articles worn by an individual, including personnel and protective gear, as well as directly to the individual. As noted above, in preferred embodiments of the modules 10 and 30, the memory 16 is able to store the data generated by the sensing elements 12 even if there is no external power supplied to the module 10 for extended periods of time. In this manner, the modules 10 and 30 are particularly well suited for use over extended periods of time. In particular, wireless sensing modules of the type described in reference to FIGS. 1 and 2 can be used for many purposes, including tracking and recording one or more of a variety of environmental parameters, including but not limited to impacts (acceleration and deceleration) that may occur to individuals participating in athletic and recreational activities, and impacts and shock wave pulses (pressure) to which military personnel may be subjected. Preferred acceleration sensing elements 33 have sensing capabilities of a range of about 0.1 g to 1000 g over durations ranging from about 1 μs to several or more seconds.

Figure 14:
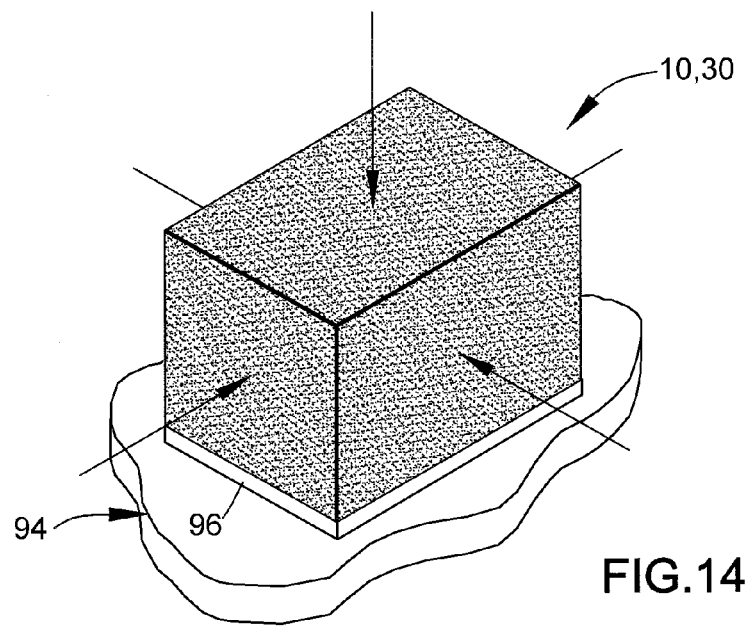
FIG. 14 schematically represents a module of the type represented in FIG. 1, in which an array of pressure sensing elements provides a multi-directional pressure sensing capability for sensing shock wave pulses in accordance with one preferred embodiment of the invention.

Various potential locations are possible for the placement of the modules 10 and 30. For accurately monitoring head trauma resulting from impacts, placement of the modules 10 and 30 is preferably by direct attachment to equipment secured to the head in close proximity to the skull to improve the correlation between the impact sensed by the sensing elements 13 and 33 and the actual impact to which the brain is subjected. For example, the modules 10 and 30 may be placed in a helmet or headband, or attached with an adhesive band directly to the skin. FIG. 14 represents that the housing of the module 10/30 may be attached with an adhesive 96 to a surface 94, for example, of the skin or skull of a living body, or of clothing apparel, gear, or sporting equipment worn by a living body. By placing the modules 10 and 30 containing highly sensitive sensing elements 13 and 33 directly to the skull to monitor its movement, a more accurate picture of potential brain injury can be determined. Placement of the modules 10 and 30 to monitor head trauma resulting from shock wave pulses can be less restrictive. For example, the modules 10 and 30 can be placed on any apparel, gear or equipment that would be exposed to the pressure waves to which the individual is subjected.

The functionality and life of the modules 10 and 30 can be considerably enhanced by configuring the sensing elements 13 and 33 to be scalable. According to preferred aspects of the invention, scalability, functionality and power efficiency of the sensing elements 13 and 33 can be greatly enhanced by configuring the sensing elements as switches that generate direct digital outputs covering a wide dynamic range. By configuring the sensing elements 13 and 33 to directly respond to external inputs without the requirement for power to be supplied to the elements 13 and 33, an ultra-low power electromechanical sensing system is provided that is entirely event-driven. As such, preferred sensing elements 13 and 33 extract energy from the external input they are intended to sense (e.g., pressure pulses, acceleration (impact, shock, vibration, movement, etc.), and temperature) to provide a direct digital output. When used to sense pressure pulses and acceleration (including impact or shock), switches are also capable of providing the advantage of minimum latency and capturing the rising edge of a pressure or shock/impact impulse.

U.S. Pat. Nos. 7,495,368 and 7,619,346 and U.S. patent application Ser. No. 11/671,130 disclose electromechanical switches particularly suitable for sensing a wide variety of parameters, including pressure, acceleration, and temperature, that can be formed as scalable arrays. As disclosed by these prior patent documents, whose contents are incorporated herein by reference, arrays of electromechanical switches are operable to close a contact if an input parameter exceeds a designed threshold to produce a digital output signal that results from current flowing through the closed contacts from an energy storage device. This mode of operation provides an ultra-low power scheme that is capable of using as little as about $10^{-12}$ joules (μJ's) of energy from an energy storage device to produce a digital output signal for each event that results in the operation of a switch. The overall energy dissipation for an array of several thousand sensing elements (switches) is on the order of about $10^{-6}$ joules (μJ's), which is one hundred to one thousand times lower than state-of-the-art analog pressure or acceleration sensors coupled to analog-to-digital (ADC) circuits. Consequently, the power requirements of the modules 10 and 30 can be drastically reduced with the use of electromechanical switches, which in some cases can allow for the elimination of the need for a battery as the energy storage device, and allow for the use of capacitors and other relatively simple devices capable of storing energy. The use of electromechanical switches as the sensing elements 13 and 33 also enables the modules 10 and 30 to be operated to be fully event-triggered with standby current draws of less than 0.1 μA, and with fast wake-up and event capture response times on the order of a few microseconds.

In view of the above, a preferred aspect of the invention is that the arrays 12 of sensing elements 13 and 33 operate by extracting mechanical or thermal energy to which a body (such as a human body) is subjected to close a contact, thereby closing a previously open electrical path, and produce a digital output signal through the resulting closed electrical path. Another preferred aspect of the invention is that individual sensing elements 13 and 33 may have different levels of sensitivity to the external input. For examples, the sensing elements 13 and 33 can be fabricated as switches that close at different threshold levels, such that different individual switches produce digital output signals in response to different input levels of the external input, with the result that the data stored in the memory 16 can be readily correlated to the overall level (amplitude) of the external input. The very small size to which the switches can be fabricated permits the integration of thousands of sensing elements 13 and 33 on a single chip measuring a few millimeters on a side using current NEMS and MEMS manufacturing processes, such that a wide range of amplitudes can be sensed.

The preferred operation for electromechanical switches for use as the sensing elements 13 and 33 in the present invention is to allow each individual switch to freely return to original open position after the level of the external input has dropped below the threshold level for the switch. In this manner, the duration that each switch is closed also provides a direct indication of the duration that the external input was above the threshold. As such, the controller 14 is able to process the outputs of the switches (elements 13 or 33) to not only generate data corresponding to the amplitude of an external input (for example, an impact), but also data corresponding to the duration of the external input. The controller 14 may also be operable to combine or integrate the amplitude and duration data according to a mathematical model, thereby reducing the amount of data that must be stored in the memory 16 and transmitted to a reader unit outside the module 10 or 30.

Exemplary but nonlimiting examples of MEMS and NEMS electromechanical switches capable of use with the present invention are represented in FIGS. 3 through 15. As discussed in more detail below, the switches include a moving microstructure that, by closing an electrical contact, creates a closed electrical path for producing an output that can be detected and processed by the controller 14 and stored in the memory 16. As noted previously, this operation is in response to an external environmental parameter. Each switch defines an open electrical path and effectively has a threshold above which it closes a contact to create a closed electrical path.

In the embodiments of FIGS. 3 through 15, electromechanical switches are represented as having various types of mechanical structures that move in response to an external environmental parameter, most notably shock/acceleration or pressure, though other types of environmental parameters are also foreseeable such as vibrations, tilt, chemical levels, temperature, etc. The environmental parameter causes the mechanical structure, initially separated from one or more contacts to form an open electrical path, to contact one or more contacts to form a closed electrical path. Either the contacts or the mechanical structure may be connected to the energy storage device of the modules 10 and 30.

The movable mechanical structure of FIGS. 3 through 6 is a cantilevered beam 56 fabricated directly on an integrated circuit substrate (e.g., CMOS wafer) 54 in which electronic devices (not shown) of the modules 10 and 30 can also be formed. An alternative is to fabricate the beam 56 on a separate substrate that is subsequently electrically coupled or bonded to the integrated circuit substrate 54. While a single beam 56 is represented on the substrate 54, it should be understood that essentially a large number of beams 54 could be fabricated on the same substrate 54, enabling a sensing module 10 or 30 in which they are used to cover a wide dynamic range of an external input, as discussed above.

In the embodiment of FIGS. 3 through 6, the cantilevered beam 56 is represented as part of a MEMS switch 36 that is responsive to impacts and/or accelerations. As evident from FIGS. 3 through 6, a proof mass 66 can be mounted on the beam 56 to increase the responsiveness of the beam 56 to a range of impact and/or acceleration levels of interest. One end of the beam 56 is anchored to the substrate 54, while the opposite end of the beam 56 is suspended between two sets of open contact pairs 62 and 64. The beam 56 may have electrically-conductive layers (not shown) for making electrical contact with the contact pairs 62 and 64. As seen in FIGS. 5 and 6, the beam 56 has two operating extremes that result in the beam 56 contacting either the upper or lower pair of contacts 62 and 64 in response to a threshold level of impact/acceleration, depending on the direction of the input impact or acceleration. For one skilled in the art, it is clear that other configurations and structures for impact/acceleration switches can be used as well, an example of which is discussed below in reference to FIG. 13.

It can be readily appreciated that the structure of the switch 36 is simple and compatible with post-CMOS processing, and that very large, high-density arrays (12 in FIGS. 1 and 2) of such switches 36 can be fabricated in a very small area. Furthermore, the sensor array 12 can contain switches 36 whose beams 56 carry different sizes of proof masses 66 and/or are intentionally of different lengths and/or widths, for example, so that certain beams 56 are more sensitive to impacts/accelerations, and so that more sensitive beams 56 will contact one of the sets of contact pairs 62 and 64 at progressively lower levels of impact/acceleration. Scaling of the feature sizes of the beams 56 improves the achievable measurement resolution in addition to the die size reduction. The beam 56 can be formed to contain additional layers of a variety of different materials, both metallic and nonmetallic, including adhesion-promoting, stress-distributing layers, and electrical contact layers, as well as patterned layers for the purpose of modifying the response of the beam 56 to the environmental input of interest.

Figure 7:
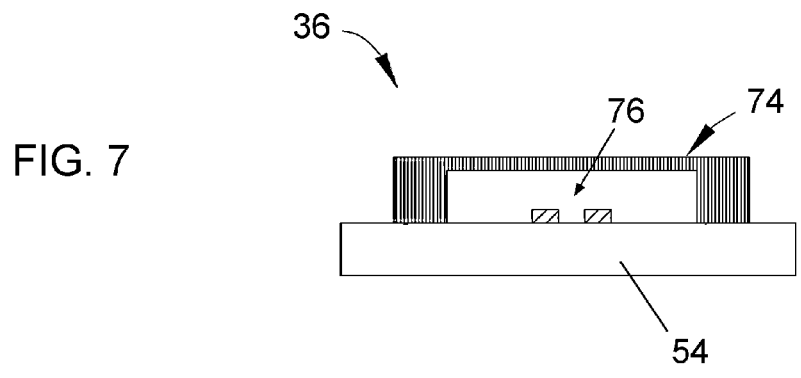
FIG. 7 schematically represents a side view of an electromechanical sensing element configured as a pressure sensing element that is suitable for use in the modules of FIGS. 1 and 2.
Figure 8:
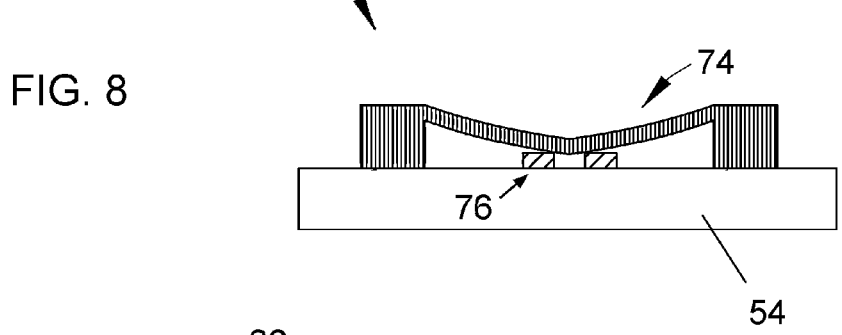
FIG. 8 schematically represents the electromechanical sensing element of FIG. 7 at one extreme of its operating range in response to a threshold pressure condition.
Figure 9:
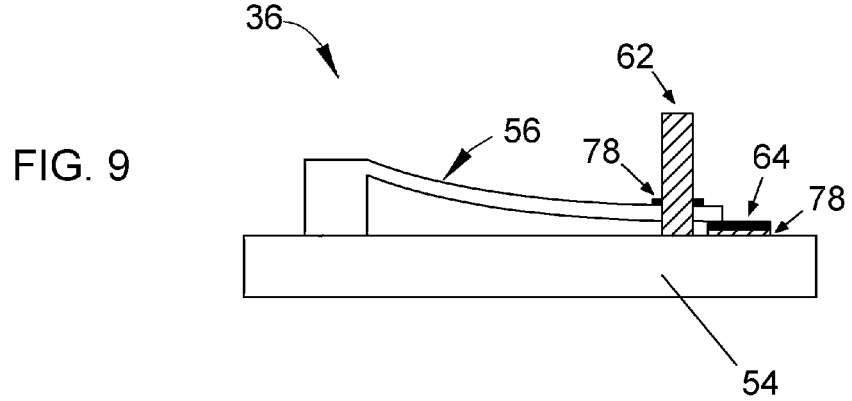
FIGS. 9 and 10 schematically represent side views of an alternative electromechanical sensing element that is suitable for use in the modules of FIGS. 1 and 2.
Figure 10:
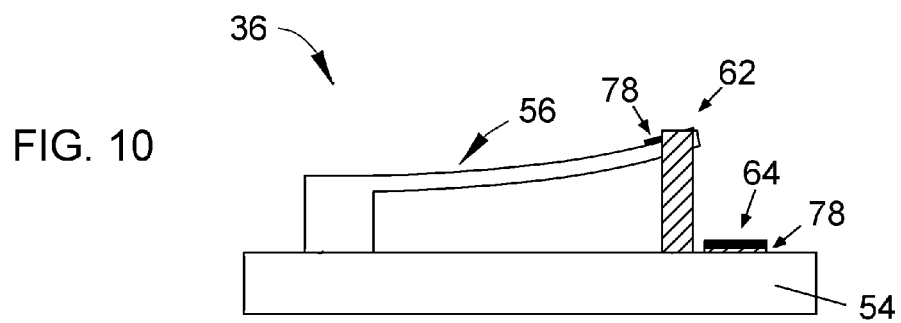

FIGS. 7 and 8 represent another embodiment for a switch 36, in which a diaphragm 74 is used in place of the cantilevered beam 56 of FIGS. 3 to 6 for the purpose of sensing pressure, including pressures associated with shock wave pulses. From FIGS. 7 and 8, it can be seen that the diaphragm 74 is supported above a pair of contacts 76, and that by forming the diaphragm 74, or at least its lower surface facing the contacts 76, of an electrically conductive material, a closed electrical path can be created across the contacts 76 if the ambient pressure above the diaphragm 74 meets or exceeds a threshold pressure. As well known in the art, the operation and sensitivity of the pressure-sensitive switch 36 of FIGS. 7 and 8 can be enhanced by evacuating the chamber formed by and between the diaphragm 74 and the substrate 54.

As previously noted, the beams 56 and diaphragm 74 can be configured to deflect while subjected to the external input, thereby producing a digital output that is detected and processed by the controller 14 and stored in the memory 16, and then return to their non-deflected positions once the external input is absent. Alternatively, the beams 56 and diaphragm 74 or their respective contacts 62, 64, and 76 may be connected to the energy management unit 18 so as to be maintained at different electrical voltages. As a result, once contact is made, the voltage difference can result in a sufficiently large electrostatic force that keeps the beam 56 or 74 in a closed position with its contacts. As represented with the beam 56 in FIGS. 9 and 10, by providing the beam 56 and/or its contacts 62 and 64 with thin dielectric layers 78, this voltage difference can be sufficiently high and sustained to keep the beam 56 pinned to the contacts 62 or 64 even after the sensed input parameter drops below the threshold for that parameter. As with the memory 16, the switches 36 can be provided with a reset capability by discharging the contact electrostatic capacitance that holds the mechanical structures to their contacts.

Figure 11:
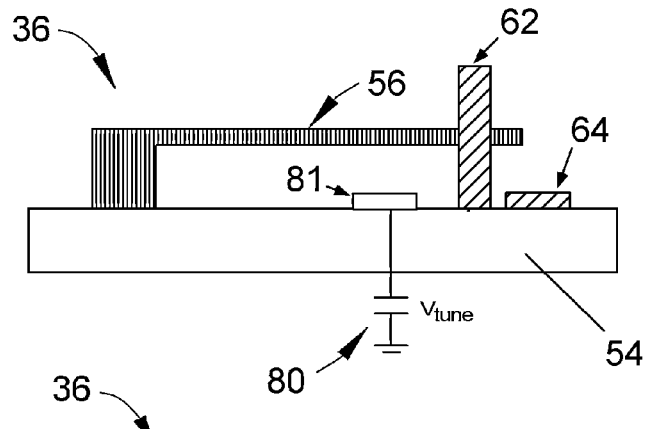
FIGS. 11 and 12 schematically represent side views of sensing elements according to FIGS. 3 through 10, further equipped with means for tuning their sensing threshold using a stored charge according to an optional aspect of the invention.
Figure 12:
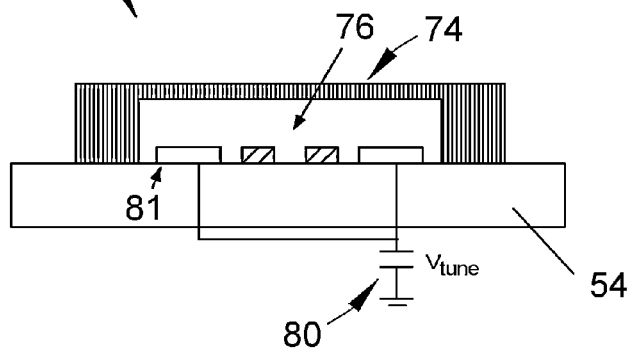

FIGS. 11 and 12 represent an approach for refining or calibrating the responses of the beams 56 and diaphragms 74 of the foregoing switches 36. In particular, FIGS. 11 and 12 depict a technique by which an adjustable electrical charge can be applied with an isolated capacitor 80 to one or more electrodes 81 placed in proximity to the beam 56 and diaphragm 74, enabling an adjustable electrostatic force to be applied that can bias (e.g., attract or repel) the beam 56 and diaphragm 74. In this manner, the deflection of the beam 56 and diaphragm 74 can be tuned so that contact with their corresponding contacts 62, 64, and 76 can be promoted or restrained.

Figure 13:
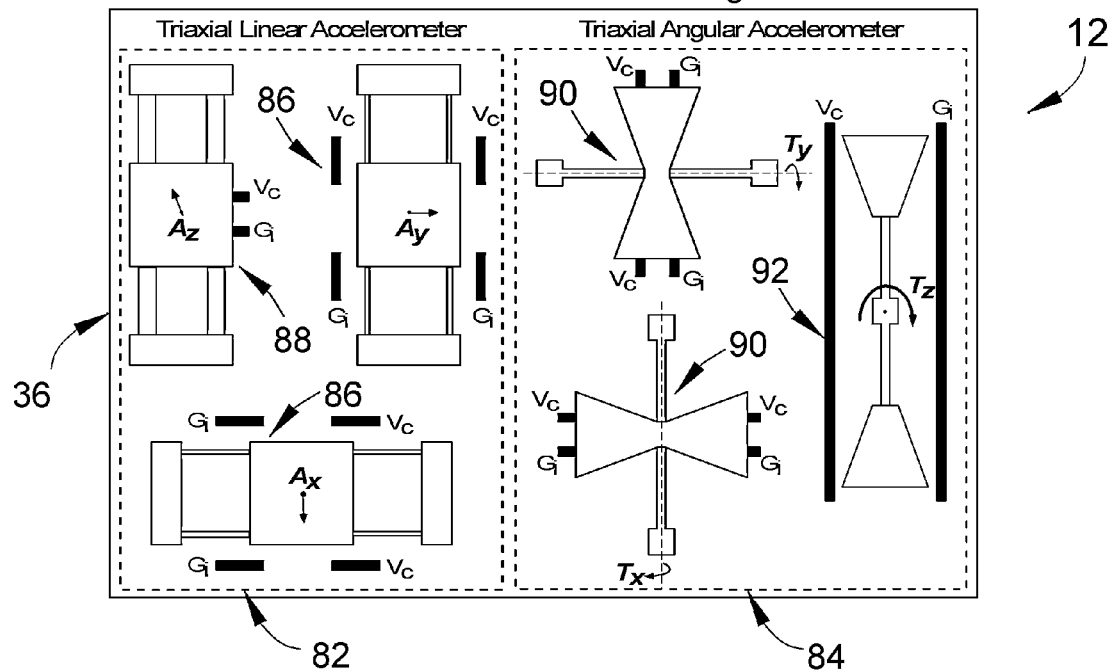
FIG. 13 schematically represents a plan view of electromechanical sensing elements suitable for use in a digital sensor array of the module of FIG. 2, and configured for sensing linear and angular acceleration with six degrees of freedom.

FIG. 13 represents an embodiment of the sensor array 12 comprising MEMS switches 36 that are suitable for being implemented with the impact-sensing module 30 of FIG. 2, though it should be understood that the switches 36 could also be utilized in the module 10 of FIG. 1. Notably, FIG. 13 shows the array 12 as comprising multiple different MEMS switches 36 that have alternative configurations other than the cantilevered beam 56 of FIGS. 3 through 6 and, as with the impact/vibration switch 36 of FIGS. 3 through 6, preferably provide in combination a six-degree of freedom (DOF) acceleration sensing capability, though sensor arrays containing combinations of sensing elements that achieve sensing capabilities other degrees of freedom are also within the scope of the invention. In FIG. 13, one set of the switches 36 constitutes a triaxial linear accelerometer array 82 that includes two lateral switches 86 and one out-of-plane switch 88, and a second set of switches 36 constitutes a triaxial angular accelerometer array 84 that includes two torsional switches 90 having in-plane axes and a torsional switch 92 having an out-of-plane axis implemented by two in-plane linear proof masses with cantilever supports placed on opposite sides of a single common anchor. Contacts are placed along opposite sides of the torsional switch 92 such that a connection can be only made if the proof masses move in opposite directions to each other. As such, a linear acceleration has no effect on the torsional switch 92 because it moves both proof masses in the same direction and opposite contacts cannot be made.

By appropriately selecting the suspension beam, proof mass, and gap between the contacts, desired switching thresholds can be obtained for the switches 36 represented in FIG. 13. Cross-axis sensitivity can be minimized by proper suspension design and proof mass design. For instance, the angular torsional switches 90 and 92 may have pie-shaped proof masses to maximize their response to external torque and minimize their linear response. The out-of-plane linear switch 88 requires a top contact (not shown) for bidirectional operation, which can be formed on a structure that also serves as an out-of-plane impact stop for all of the switches 86, 88, 90, and 92 in all axes.

As will be discussed in more detail below, the sensing elements 13 (switches 36) described in reference to FIGS. 3 through 13 can be used in a wide variety of sensing modules and in various combinations, as well as in a wide variety of applications. As a matter of convenience, the following discussion will refer to examples of such modules in reference to the modules 10 and 30 of FIGS. 1 and 2 and used for particular applications, though it should be understood that these examples do not limit the scope of the invention.

In addition to the use of acceleration-sensing switches 36 of the types represented in FIGS. 3 through 6, 9 through 11, and 13, the present invention encompasses other types of switches by which impacts can be sensed, particularly with respect to impacts resulting from blasts. One such approach is to sense shock wave pulses associated with blasts using pressure-sensing switches 36 of the type represented in FIGS. 7, 8 and 12. A previous limitation of using pressure sensors to measure shock wave pulses is that most pressure sensing devices are directional. In particular, the magnitude of a pressure measurement detected by a directional pressure sensing device is proportional to the cosine of the angle from the peak detection direction (usually orthogonal to the surface of the sensor). Therefore, the magnitude of a pressure measurement detected by a directional pressure sensing device will depend on the orientation of the device relative to the location of a blast source. However, the direction from which a blast is coming is unknown before it happens. To address this, FIG. 14 schematically represents a module 10 of the type represented in FIG. 1, in which an array 12 of pressure sensing elements 13 provides a multi-directional pressure sensing capability for sensing shock wave pulses. The module 10 in FIG. 14 is represented as sensing pulses received from five different directions that are orthogonal to each other. The side of the module 10 that is not adapted to sense pressure allows for attachment of the module 10 to a body.

Figure 15:
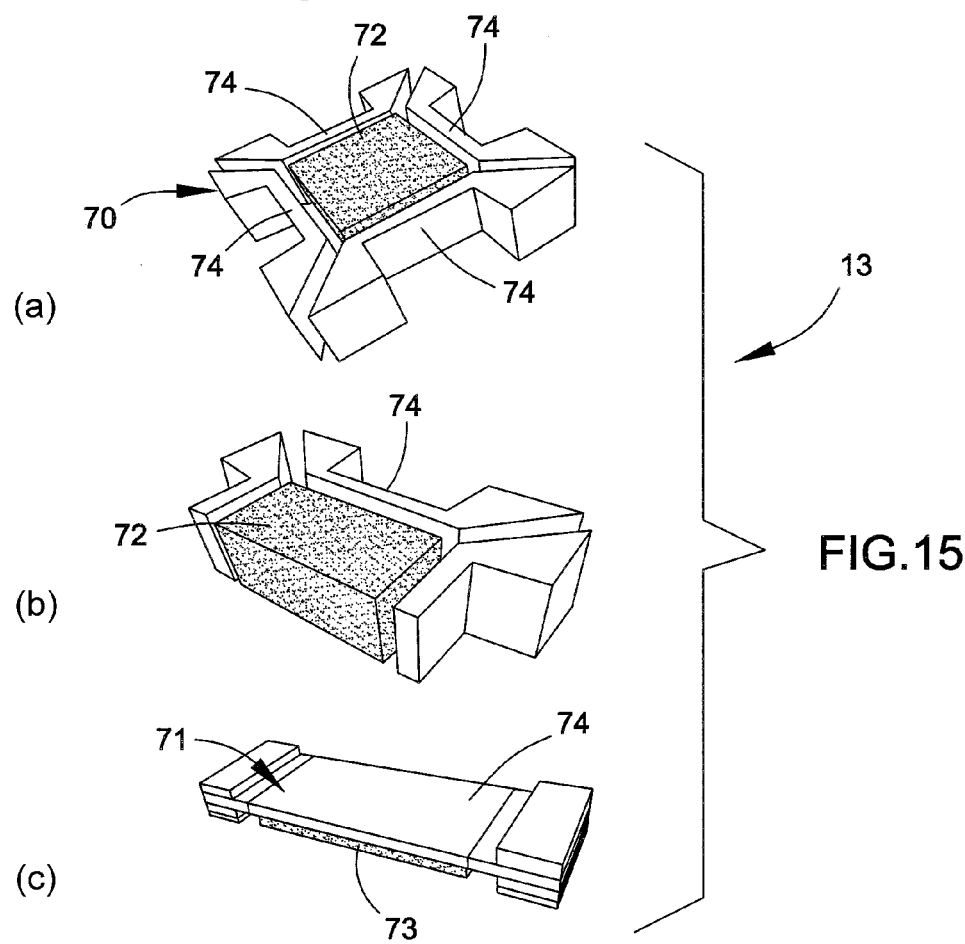
FIG. 15 schematically shows three views of suitable electromechanical sensing elements suitable for use in the module of FIG. 14.

FIG. 15 represents three views of an embodiment of a multidirectional electromechanical pressure sensing element 13 suitable for use in the module 10 of FIG. 14. The sensing element 13 comprises five individual diaphragms 74, each oriented to sense a pressure pulse from a different direction. The upper view (a) in FIG. 15 is a perspective view of a base 70 made up of four sections that define four diaphragms 74 adapted to sense pressures received from four directions parallel to the base 70. The middle view (b) of FIG. 15 is a cross-section of the upper view, and the lower view (c) of FIG. 15 is a perspective view of a second base 71 that defines a fifth diaphragm 74 adapted to sense pressures received from a direction perpendicular to the four directions depicted in view (a) of FIG. 15. The bases 70 and 71 can be located adjacent each other on a single substrate, such as the substrate 54 represented in FIGS. 7 and 8. The first base 70 of the sensing element 13 contains a fixed electrode 72 surrounded by its four diaphragms 74. The diaphragm 74 defined by the second base 71 is suspended above a second fixed electrode 73. Each of the five diaphragms 74 is a movable electrode separated from its fixed electrode 72 or 73 by a small air gap. As a pressure wave hits the sensing element 13, the component of the pressure wave orthogonal to each diaphragm 74 is sensed. An effectively omni-directional pressure sensing module 10 can be constructed by incorporating an array 12 containing a large number of the sensing elements 13, which in some embodiments may be oriented relative to each other so that their sensing directions are not necessarily parallel to each other.

As described previously with reference to FIGS. 7 and 8, each sensing element 13 functions as an electrical switch, such that the sensing element 13 produces one or more digital outputs that can be detected and processed by the controller 14 of the module 10. The sensing element 13 is in an ON state when a blast pressure pulse sensed by any of its diaphragms 74 reaches a threshold for that diaphragm 74, but is otherwise in an OFF state. As a sensed pressure increases, the diaphragms 74 (movable electrodes) move toward their fixed electrodes 72 and 73 and, if the pressure is sufficiently high at a diaphragm 74, that diaphragm 74 contacts its fixed electrode 72 or 73, causing an electrical short that can be detected by the controller 14. Since pressure sensitivity depends on the deflections of the thin diaphragms 74 and the size of their respective air gaps, the sensitivity of the sensing element 13 can be increased or decreased by scaling the dimensions of the diaphragms 74 and/or their air gaps. In addition, a dynamic pressure range of the module 10 can be extended by providing the array 12 with sensing elements 13 having different ranges of sensitivities due to differences in the dimensions of their diaphragms 74 and/or air gaps, effectively decoupling the pressure sensitivity of the module 10 from its dynamic range. Using geometric calculations between multiple diaphragms 74 of multiple sensing elements 13, the magnitude and direction of a blast can be determined.

The sensing element 13 depicted in FIG. 15 can be fabricated using a variety of different standard MEMS and NEMS processes using surface micromachining and bulk micromachining techniques known to those skilled in the art. As a nonlimiting example, to fabricate the base 70, its diaphragms 74 and the fixed electrode 72 can be formed using a high-aspect ratio deep silicon etch performed on a silicon-on-insulator (SOI) wafer. The base 71, its diaphragm 74 and fixed electrode 73 can be fabricated from low-stress polysilicon using surface micro-machining techniques.

Figure 16:
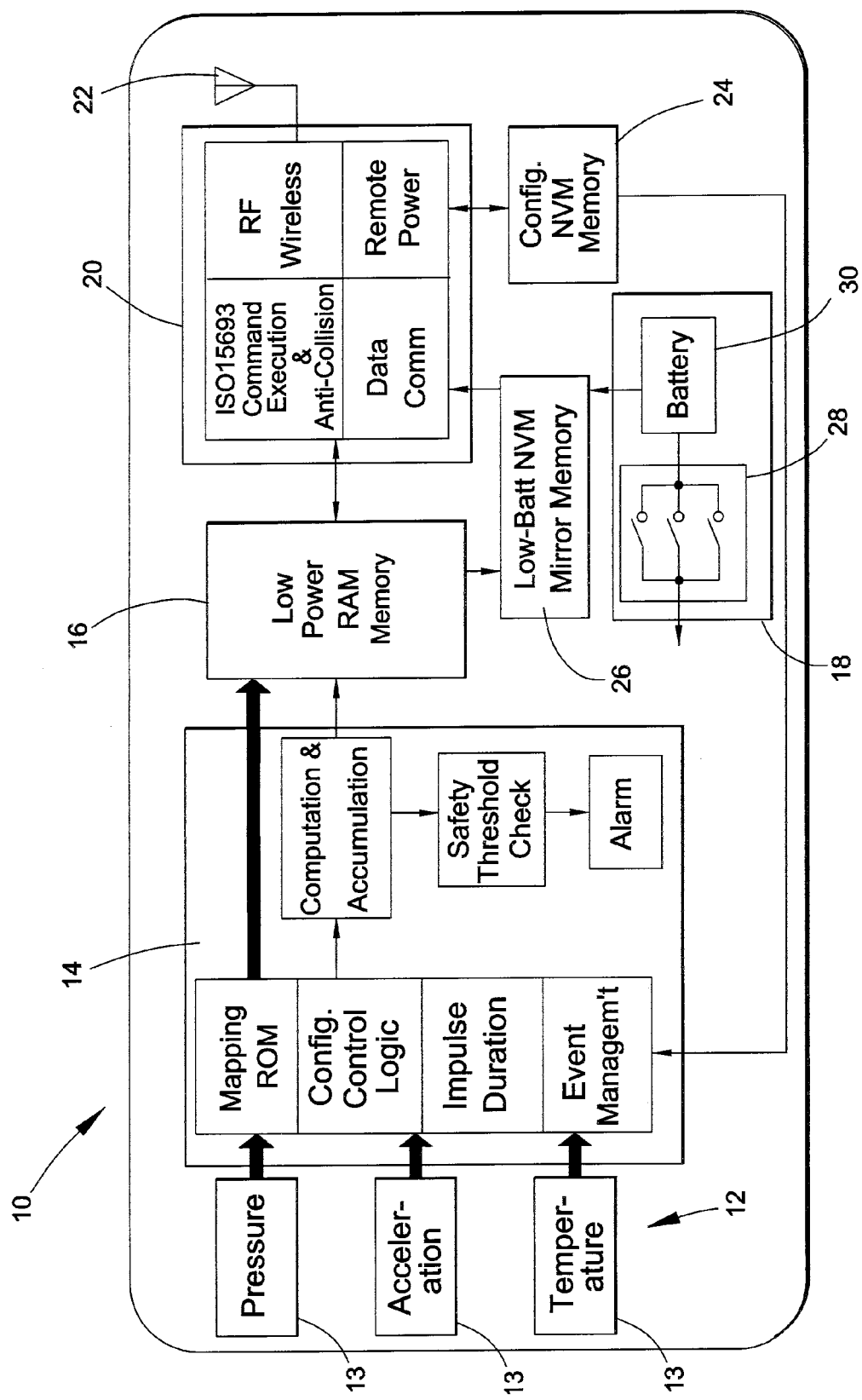
FIG. 16 is a more detailed schematic representation of a module of the type shown in FIG. 1, wherein the module is particularly adapted as a wireless blast micro-dosimeter.

FIG. 16 shows a detailed block diagram of a particular embodiment of the module 10 of FIG. 1 specifically configured as a wireless blast micro-dosimeter system. The array 12 of sensing elements 13 is presented as comprising any number of elements 13 for sensing pressure for sensing shock wave pulses associated with blasts. The sensing element 13 represented in FIG. 15 is exemplary for this purpose. The array 12 of sensing elements 13 is further represented as containing any number of elements 13 adapted for sensing temperature, and any number of elements 13 for sensing accelerations and decelerations of a body when subjected to a blast. The number of elements 13 of each type can be selected to provide a large range of responses and can be configured digitally using values stored in configuration non-volatile memory (NVM) 24, which is represented as being in addition to the memory 16 for storing the data associated with the outputs of the sensing elements 13. The outputs of the sensing elements 13 are interfaced with the controller 14, and in particular a ROM-based digital circuit that maps the sensor switch input to a digital code for the impulse duration measurements and parameter dose computation (accumulation). The accumulated dose will be constantly monitored by comparison against user programmable values and the alarm bit will be set if safe values are exceed. The module 10 includes an alarm, which may be a stored bit, a wireless signal, or a visual blinking LED based on requirements or preferences for the intended application. The sensor and impulse duration values are stored on the memory 16, which is identified in FIG. 16 as a low-power RAM memory that automatically gets backed up to a mirror NVM 26 in the case of low-battery or power failure. This scheme provides extended battery life while preserving the data integrity in the field. Standby power is minimized by using a series array of fast micro-switches 28 that apply the system with power from a battery 30 only when blast impulse detected.

The direct digital outputs of the sensing elements 13 allow fast data capture, as unlike analog sensors a finite stabilization and settling time for the sensor readout circuitry is not present. As noted previously, the wireless data link through the wireless communications block 20 can be based on standard 13.56 MHz RFID operating under ISO15693/ISO18000-3 protocol. The module 10 can be adapted to receive power from a reader unit (not shown) when present within its communication field, receive data, and transmit data to the reader unit through, for example, backscattering at a rate of 26.4 kbsps. The interface executes standard ISO15603 commands, including memory read/write, and manages collision of multiple modules (e.g., 10 and/or 30) to allow simultaneous communication with multiple modules.

Figure 17:
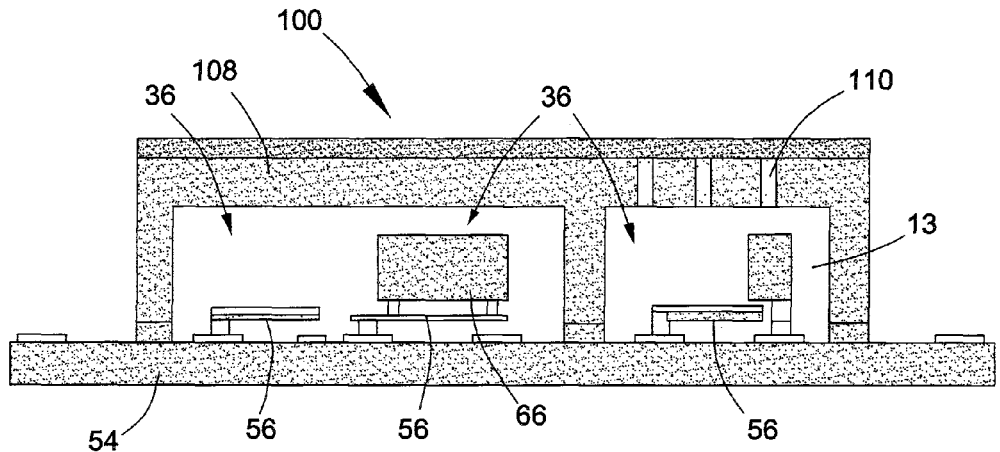
FIG. 17 schematically shows a chip package containing multiple arrays of electromechanical sensing elements suitable for use in modules of the types represented in FIGS. 1 and 2.

FIG. 17 represents a cross-sectional view of an embodiment of an array 12 of MEMS or NEMS sensing elements 13 configured as switches 36 comprising cantilevered beams 56, though it should be understood that the switches 36 could include or consist entirely of switches 36 comprising diaphragms 74 of the type shown in FIGS. 7 and 8 and/or lateral, out-of-plane, and torsional switches 86, 88, 90 and 92 of the types shown in FIG. 13. In the embodiment as shown, the switches 36 are adapted to sense a variety of different inputs, including impacts by using switches 36 as described in reference to FIGS. 3 through 6, as well as various other types of switches 36 having cantilevered beams 56, such as bimorph temperature and/or humidity sensing switches of the types described in U.S. patent application Ser. No. 11/671,130. Because of this multi-functionality, the array 12 of FIG. 17 will be described in reference to the module 10 in FIG. 1.

The switches 36 can be integrated onto or directly attached to a substrate 54, which may be, for example, a CMOS chip in which circuitry (not shown) for the module 10, such as the controller 14 and wireless communications block 20, can be fabricated. Two of the sensing elements 13 (for example, a bimorph temperature-sensing switch 36 and an impact-sensing switch 36) are sealed within a cavity defined between the substrate 54 and a cap 108 that protect the enclosed elements 13 from the environment, while a separate cavity defined by the substrate 54 and cap 108 contains a third element 13 (for example, a bimorph humidity-sensing switch) and is vented to the environment with access holes 110 formed in the cap 108. In combination, the resulting assembly defines a sensor chip package 100 that can be manufactured using wafer-level packaging methods to contain one or more arrays 12 of any number of sensing elements 13 and can be mounted on any suitable substrate.

Figure 18:
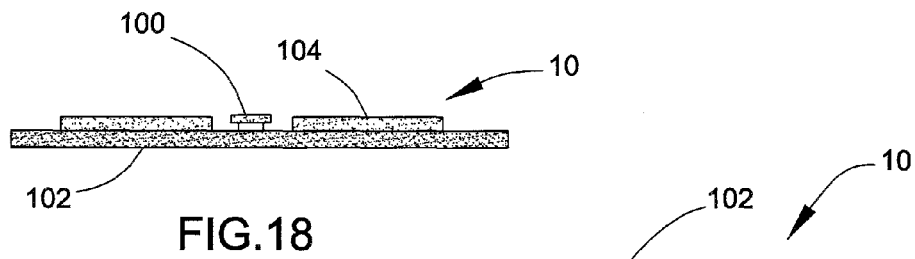
FIGS. 18 and 19 schematically represent side and plan views, respectively, showing the chip package of FIG. 17 placed in a flexible substrate.
Figure 19:
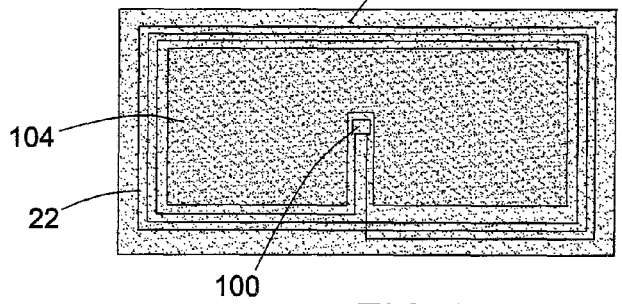

FIGS. 18 and 19 represent side and top views, respectively, of the chip package 100 of FIG. 17 mounted to a flexible substrate 102 to form a physical embodiment of the module 10. The antenna 22 is shown as being printed or patterned onto the flexible substrate 102. The module 10 is shown as including a thin film battery 104 as a component of the energy management unit 18 of FIG. 1. The battery 104 can be printed onto the substrate 102 and then encapsulated, or can be prefabricated and then attached to the flexible substrate 102 with epoxy or by any other suitable technique known in the art. Another option is to print the antenna 22 directly on the flexible battery 104. In the embodiment shown, the sensor chip package 100 can be connected to the antenna 22 and battery 104 using such techniques as wire bonding, flip chip bonding, solder bonding, or any other method known to those skilled in the art. The module memory 16 (not shown) can also be integrated onto the flexible substrate 102, allowing the entire module 10 to be comprised of a small flexible unit that can be directly placed on the skin of an individual, embedded in equipment or apparel worn by an individual, or placed on any other object whose environment requires sensing.

Figure 20:
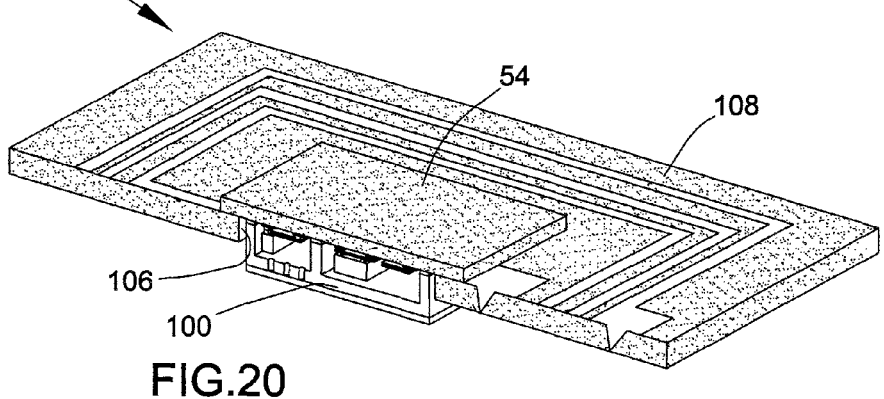
FIG. 20 schematically represents a perspective view showing the chip package of FIG. 17 placed in an alternative flexible substrate.
Figure 25:
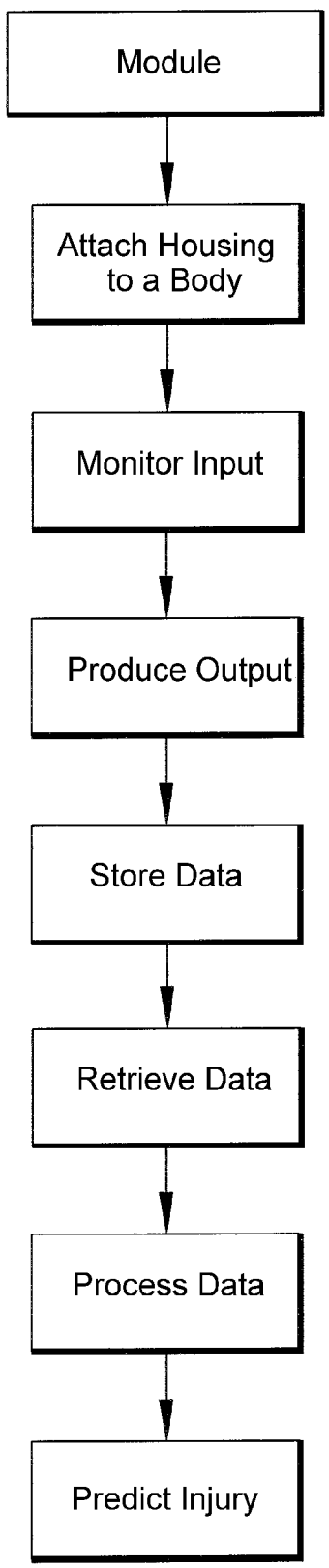
FIG. 25 schematically represents a method of monitoring at least one external environmental input to which a body is subjected in accordance with a nonlimiting embodiment of the invention.

FIG. 20 represents an alternative embodiment to that shown in FIGS. 18 and 19 as a result of the chip package 100 being placed within an opening 106 in the flexible substrate 102, so that the cap 108 protrudes through the opening 106 and the access holes 110 are exposed to the surrounding environment. The surface of the flexible substrate 102 surrounding the substrate 54 and optionally the backside of the substrate 54 can be provided with an adhesive for attaching the module 10 to a surface of the body whose environment is to be monitored.

FIGS. 21 and 22 depict side and top cross-sectional views of another embodiment that includes a package 120 containing multiple chip packages 100, which in turn combine to define an array 12 of sensing elements 13 that include a combination of switches 36 formed with beams 56 of the type shown in FIGS. 3 through 6, switches 36 formed with diaphragms 74 of the type shown in FIGS. 7 and 8, and lateral, out-of-plane, and torsional switches 86, 88, 90 and 92 of the types shown in FIG. 13. The package 120 is adapted for use in harsh environments, and for this reason is represented as comprising housing members 122 that encapsulate one or more of the chip packages 100 containing the sensing elements 13 adapted for sensing impacts (e.g., the beam switches 36 and lateral, out-of-plane, and torsional switches 86, 88, 90 and 92), while one or more chip packages 100 containing the sensing elements 13 adapted for sensing pressure (e.g., the diaphragm switches 36 of FIGS. 7 and 8) remain vented to the surrounding environment.

While many sensing systems and research utilize peak impact to determine levels of head trauma, it has been determined that both amplitude and duration are important for determining the level of head trauma resulting from decelerations associated with impacts and accelerations associated with shock wave pulses from blasts. Models such as Head Injury Criterion (HIC), which is currently used to evaluate the efficacy of helmets, provide output based upon mathematical models that factor in both levels of impact and duration criteria. As previously discussed, the modules 10 and 30 of this invention can have the capability of recording both amplitudes and durations of impacts and shock wave pulses. To calculate the HIC value, the magnitude of the impact and the duration are multiplied and are summed over the duration of the impact. If the HIC value is above a certain threshold, then an injury is predicted. This HIC value can be calculated using a program in an external reader unit from the data stored in the memory 16, or the value can generated by multiplying and summing the incoming data with the controller 14 and then accumulated and stored in the memory 16. The latter option requires processing of the data as part of the sensing system. FIGS. 23 and 24 depict two approaches to significantly reduce power consumption when calculating the HIC value with the module 10. In FIG. 23, a clock prescaler 32 and counters 34 are used, the latter of which is started when an event level is triggered and determines the amount of time that an event meets or exceeds the event level. Multiple counters 34 can be utilized and their values are summed. FIG. 24 represents the use of a digital accumulate/adder 35 in an asynchronous event-triggered digital add and accumulate approach that starts a clock when an event occurs. Each known interval (time slice) is multiplied by a digitally-encoded value from the digital acceleration switches (for example, the switches 36 in FIGS. 3 through 6 and/or the switches 86, 88 and 90 in FIG. 13). The system continuously adds the sensor level multiplied by the time to get an accumulated value. This value can be compared to a table to determine level of impact.

In view of the above, data retrieved from the modules 10 and 30 can be directly employed to predict the likelihood or risk of injury resulting from one or more impacts and shock wave pulses suffered by an individual. The modules 10 and 30 are also well suited for use in head trauma monitoring systems. Such a capability is of particular interest in view of investigations concerning the long term effects of multiple mild traumatic brain injuries (TBIs). Postmortem studies of the brains of American football players that have suffered from multiple concussions have shown that there is widespread damage throughout the brain. The brain tissue damage in autopsied brains appeared similar to tissue from patients suffering from Alzheimer's disease, even though many of the subjects were otherwise young and healthy. In these subjects, none of this damage appeared on MRI or CT scans, yet damage due to concussions can affect parts of the brain that effect emotion, rage, etc. and it has been found that the even mild TBI can kill brain cells and neural connections. Occurrence of mental disorders including major depression and attention deficit in people that have suffered from multiple concussions has been shown to be common. It is anticipated that early detection and treatment of head impacts would provide improved recovery from these injuries. For example, recent studies have shown that certain Alzheimer's disease medications can be helpful in reducing the damage caused by TBI if treated in a timely manner. Certain embodiments of the modules 10 and 30 of this invention are capable of monitoring head trauma to quickly and accurately determine level of trauma, which enables medical personnel to more accurately assessment of injury, improving treatment methodologies through early intervention.

In view of the foregoing, it should be appreciated that sensing modules of the types described above are well suited for relatively low-cost mass production process using post-CMOS mass production MEMS technologies. To minimize package size and external parasitic impedance, the micro- or nano-electromechanical (MEMS or NEMS) sensing elements 13 and 33 can be integrated directly on the integrated circuit chip on which the circuitry for the controller 14 is fabricated. The sensing elements 13 and 33 can be fabricated subsequent to forming the CMOS integrated circuits, and then integrated onto the surface of the CMOS chip, or fabricated and attached to the CMOS chip using techniques such as flip-chip bonding, wire-bonding or other methodologies known to those skilled in the art. Encapsulation of the circuits and sensing elements 13 and 33 may be achieved using any of a variety of techniques, but is not limited to solder bonding, gold eutectic bonding, fusion bonding, polymer bonding, or any other technique known to those skilled in the art. Wafer-level packaging of the modules 10 and 30 can be employed to reduce costs and seal the components of the modules 10 and 30 from the damaging effects of the environment. By hermetically sealing the packaging, the modules 10 and 30 can be operable for many years. Power efficient digital signal processing enabled by the digital outputs of an array of switches can be employed to provide flexibility and programmability, in conjunction with extended features such as on-chip calculations capable of correlating the injury to the recorded parameters. It should also be apparent that modules 10 and 30 described above can be adapted for use in a wide variety of applications that can be implemented with wired and wireless sensor modules, or used in conjunction with passive and active RFID tags for RFID-based sensors.

While the invention has been described in terms of particular embodiments, it is apparent that other forms could be adopted by one skilled in the art. For example, the physical configurations and uses of the modules 10, switches 36, etc., could differ from those shown and described, and materials and processes other than those noted could be use. Therefore, the scope of the invention is to be limited only by the following claims.

The invention claimed is:

1. A sensing module for monitoring at least one external environmental input, the sensing module comprising:
a housing;
at least one energy storage device within the housing;
at least one set of electromechanical sensing elements within the housing, the electromechanical sensing elements being individually responsive to an external environmental input, each of the electromechanical sensing elements defining an open electrical path when not subjected to the external environmental input and operable to define a closed electrical path that produces an output in response to the external environmental input only while the electromechanical sensing element is subject to the external environmental input, only if the external environmental input is at a level that exceeds a threshold of the electromechanical sensing element, and only for a duration during which the level of the external environmental input exceeds the threshold of the electromechanical sensing element, then again defining the open electrical path thereof so as not to produce the output when no longer subject to the level of the external environmental input that exceeded the threshold thereof, the output of each of the electromechanical sensing elements indicating the threshold of the external environmental input that produced the output and corresponding to the duration that the level of the external environmental input exceeded the threshold thereof;
means within the housing for generating data corresponding to the outputs of the electromechanical sensing elements, the data comprising an amplitude of the external environmental input and the durations that the level of the external environmental input exceeded the thresholds of the electromechanical sensing elements; and
means within the housing for recording the data;
wherein the electromechanical sensing elements, the generating means, and the recording means are powered only by the energy storage device when, respectively, producing the output, generating the data, and recording the data in response to the external environmental input that exceeded the threshold of one or more of the electromechanical sensing elements.

2. The sensing module according to claim 1, wherein the housing is attached to skin of a living body that is subjected to the external environmental input.

3. The sensing module according to claim 1, wherein the housing comprises an adhesive for temporarily attaching the housing to a living body that is subjected to the external environmental input.

4. The sensing module according to claim 1, wherein the housing is attached to clothing apparel so as to be worn by a living body that is subjected to the external environmental input.

5. The sensing module according to claim 1, wherein the housing is attached to sporting equipment so as to be worn by a living body that is subjected to the external environmental input.

6. The sensing module according to claim 5, wherein the sporting equipment is chosen from the group consisting of helmets, earpieces, and mouth guards.

7. The sensing module according to claim 1, further comprising means for wirelessly retrieving the data stored in the recording means.

8. The sensing module according to claim 1, wherein the recording means comprises nonvolatile digital memory devices.

9. The sensing module according to claim 1, wherein the set of electromechanical sensing elements comprises a plurality of integrated electromechanical switches, the electromechanical switches are open to define the open electrical paths when not subjected to the external environmental input and close to define the closed electrical paths that produce the outputs while subject to the external environmental input if the external environmental input exceeds the thresholds thereof.

10. The sensing module according to claim 9, wherein the electromechanical switches have different thresholds so as to have different levels of sensitivity to the external environmental input.

11. The sensing module according to claim 1, wherein the electromechanical sensing elements have different thresholds so as to have different levels of sensitivity to the external environmental input.

12. The sensing module according to claim 1, wherein the housing is adapted to be attached to or worn by a living body that is subjected to the external environmental input, and the electromechanical sensing elements have different thresholds so as to have different levels of sensitivity to the external environmental input.

13. The sensing module according to claim 12, wherein the external environmental input is pressure.

14. The sensing module according to claim 13, wherein the electromechanical sensing elements are responsive to pressures from at least five different directions wherein each of the at least five different directions is orthogonal to another of the at least five different directions.

15. The sensing module according to claim 12, wherein the external environmental input is impact.

16. The sensing module according to claim 15, wherein the electromechanical sensing elements are responsive to impacts from at least five directions wherein each of the at least five directions is orthogonal to another of the at least five directions.

17. The sensing module according to claim 16, further comprising means within the housing for processing the amplitude and duration of the data and predicting the likelihood or risk of injury to the living body resulting from the impacts.

18. The sensing module according to claim 1, further comprising means within the housing for processing the amplitude and duration of the data and predicting the likelihood or risk of injury to the living body resulting from the pressures.

19. A method of monitoring at least one external environmental input to which a body is subjected, the method comprising:
providing a sensing module that comprises a rigid housing containing at least one energy storage device, at least one set of electromechanical sensing elements that are individually responsive to at least one external environmental input, means for generating outputs corresponding to the external environmental input to which the electromechanical sensing elements are subjected, and means for recording data corresponding to the outputs, each of the electromechanical sensing elements being operable to produce an output in response to the external environmental input only while the electromechanical sensing element is subject to the external environmental input, only if the external environmental input is at a level that exceeds a threshold of the electromechanical sensing element, and only for a duration during which the level of the external environmental input exceeds the threshold of the electromechanical sensing element;
attaching the housing to a body;
monitoring the external environmental input to which the body is subjected by monitoring multiple levels of the external environmental input to which the electromechanical sensing elements are subjected while attached to the body;
producing the outputs of the electromechanical sensing elements corresponding to the levels of the external environmental input sensed by the electromechanical sensing elements that exceeded the thresholds thereof;
storing data in the recording means within the housing corresponding to the outputs of the electromechanical sensing elements, the data comprising an amplitude of the external environmental input that produced the outputs of the electromechanical sensing elements and corresponding to the durations that the level of the external environmental input exceeded the thresholds of the electromechanical sensing elements; and then
retrieving the data stored in the recording means while the housing remains attached to the body.

20. The method according to claim 19, wherein the body is a living body that is subjected to the external environmental input, and the method further comprises temporarily attaching the housing to skin of the living body with adhesive.

21. The method according to claim 19, wherein the body is a living body that is subjected to the external environmental input, and the method further comprises attaching the housing to clothing apparel worn by the living body.

22. The method according to claim 19, wherein the body is a living body that is subjected to the external environmental input, and the method further comprises attaching the housing to sporting equipment worn by the living body.

23. The method according to claim 22, wherein the method further comprising selecting the sporting equipment from the group consisting of helmets, earpieces, and mouth guards.

24. The method according to claim 19, the method further comprising wirelessly retrieving the data stored in the recording means.

25. The method according to claim 19, wherein the storing step comprises storing the data while the recording means is not supplied power external of the housing.

26. The method according to claim 19, wherein the electromechanical sensing elements comprise a plurality of integrated electromechanical switches, the electromechanical switches are open to define open electrical paths when not subjected to the external environmental input, the method further comprising closing at least some of the electromechanical switches to define closed electrical paths that produce the outputs thereof by subjecting the electromechanical switches to the external environmental input that exceeds the thresholds of the at least some electromechanical sensing elements.

27. The method according to claim 19, wherein the providing step further comprises providing the electromechanical sensing elements to have different thresholds so as to have different levels of sensitivity to the external environmental input.

28. The method according to claim 19, wherein the body is a living body and the method further comprises attaching the housing to the living body or wearing the housing by the living body.

29. The method according to claim 28, wherein the external environmental input is pressure and the electromechanical sensing elements are diaphragms, and the method further comprises the diaphragms deflecting in response to pressure.

30. The method according to claim 29, further comprising the electromechanical sensing elements responding to pressures from at least five directions wherein each of the at least five directions is orthogonal to another of the at least five directions.

31. The method according to claim 30, further comprising processing the amplitude and duration of the data and predicting the likelihood or risk of injury to the living body resulting from the pressures.

32. The method according to claim 28, wherein the external environmental input is impact and the electromechanical sensing elements are cantilevered beams, and the method further comprises the cantilevered beams deflecting in response to impact.

33. The method according to claim 32, further comprising the electromechanical sensing elements responding to impacts from at least five directions wherein each of the at least five directions is orthogonal to another of the at least five directions.

34. The method according to claim 33, further comprising processing the amplitude and duration of the data and predicting the likelihood or risk of injury to the living body resulting from the impacts.

35. A sensing module for monitoring at least one external environmental input, the sensing module comprising:
a base comprising at least first, second, third and fourth electromechanical sensing elements that are individually responsive to pressure as an external environmental input received from at least four different directions, each of the first, second, third and fourth electromechanical sensing elements comprising a movable electrode; and
a fixed electrode surrounded by the first, second, third and fourth electromechanical sensing elements and separated from the movable electrodes thereof by an air gap,
wherein each of the first, second, third and fourth electromechanical sensing elements defines an open electrical path when not subjected to the external environmental input and operable to define a closed electrical path with the fixed electrode that produces an output in response to the external environmental input only while the electromechanical sensing element is subject to the external environmental input, only if the external environmental input is at a level that exceeds a threshold of the electromechanical sensing element, and only for a duration during which the level of the external environmental input exceeds the threshold of the electromechanical sensing element, then again defining the open electrical path thereof so as not to produce the output when no longer subject to the level of the external environmental input that exceeded the threshold thereof.

36. The sensing module according to claim 35, wherein each of the first, second, third and fourth electromechanical sensing elements is a diaphragm.

37. The sensing module according to claim 36, further comprising a fifth diaphragm separated from the fixed electrode by an air gap and adapted to sense pressure from a direction perpendicular to each of the four different directions.

38. A sensing module for monitoring at least one external environmental input, the sensing module comprising:
at least a set of electromechanical sensing elements individually responsive to an external environmental input, each electromechanical sensing element of the set of electromechanical sensing elements producing a digital output signal in response to the external environmental input only if the external environmental input is at a level that exceeds a threshold of the electromechanical sensing element and only for a duration during which the level of the external environmental input exceeds the threshold of the electromechanical sensing element;
means for generating data corresponding to the outputs of the set of electromechanical sensing elements, the data comprising an amplitude of the external environmental input and the durations that the level of the external environmental input exceeded the thresholds of the set of the electromechanical sensing elements; and
means for recording the data.

39. The sensing module according to claim 38, wherein the set of electromechanical sensing elements, the generating means, and the recording means are within a housing attached to one of: skin of a living body that is subjected to the external environmental input; clothing apparel so as to be worn by a living body that is subjected to the external environmental input; sporting equipment so as to be worn by a living body that is subjected to the external environmental input.

40. The sensing module according to claim 38, further comprising means for wirelessly retrieving the data stored in the recording means.

41. The sensing module according to claim 38, wherein the recording means comprises nonvolatile digital memory devices.

42. The sensing module according to claim 38, wherein the set of electromechanical sensing elements comprises a plurality of integrated electromechanical switches, each of the electromechanical switches is open to define an open electrical path when not subjected to the external environmental input and closes to define a closed electrical path that produces the output thereof while subject to the external environmental input if the external environmental input exceeds the threshold thereof.

43. The sensing module according to claim 38, wherein the electromechanical switches have different thresholds so as to have different levels of sensitivity to the external environmental input.

* * * * *